United States Patent
Azami (10) Patent No.: US 11,011,774 B2
(45) Date of Patent: May 18, 2021

(54) LITHIUM-ION SECONDARY BATTERY

(71) Applicant: NEC Corporation, Tokyo (JP)

(72) Inventor: Takeshi Azami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 20 days.

(21) Appl. No.: 15/534,254

(22) PCT Filed: Dec. 11, 2015

(86) PCT No.: PCT/JP2015/084827
§ 371 (c)(1),
(2) Date: Jun. 8, 2017

(87) PCT Pub. No.: WO2016/098708
PCT Pub. Date: Jun. 23, 2016

(65) Prior Publication Data
US 2018/0261878 A1  Sep. 13, 2018

(30) Foreign Application Priority Data

Dec. 16, 2014 (JP) .............................. JP2014-254122
Mar. 24, 2015 (JP) .............................. JP2015-061426

(51) Int. Cl.
*H01M 10/0525* (2010.01)
*H01M 4/525* (2010.01)
(Continued)

(52) U.S. Cl.
CPC ......... *H01M 10/0525* (2013.01); *H01M 4/50* (2013.01); *H01M 4/525* (2013.01);
(Continued)

(58) Field of Classification Search
CPC ....... H01M 10/05–0525; H01M 10/056–0569; H01M 4/13–133
See application file for complete search history.

(56) References Cited

U.S. PATENT DOCUMENTS

| 6,416,902 B1 * | 7/2002 | Miyasaka | ............... H01M 4/58 429/223 |
| 2008/0160407 A1 * | 7/2008 | Ishii | ..................... H01M 4/131 429/218.1 |

(Continued)

FOREIGN PATENT DOCUMENTS

| JP | 10-302768 | 11/1998 |
| JP | 2000-353525 | 12/2000 |

(Continued)

OTHER PUBLICATIONS

International Search Report and Written Opinion dated Mar. 15, 2016, in corresponding PCT International Application.
(Continued)

*Primary Examiner* — Jonathan Crepeau
*Assistant Examiner* — Jacob Buchanan (57) ABSTRACT

There is provided a lithium ion secondary battery having excellent cycle characteristics at a high temperature and comprising lithium nickel composite oxides, in which the Ni content is high, in a positive electrode. The present invention relates to a lithium ion secondary battery having a positive electrode, a negative electrode and an electrolyte solution, wherein the positive electrode comprises a lithium nickel complex oxide denoted by the general formula, $LiNi_xCo_yMn_zO_2$, wherein x, y, and z are respectively $0.75 \leq x \leq 0.85$, $0.05 \leq y \leq 0.15$, and $0.10 \leq z \leq 0.20$.

7 Claims, 2 Drawing Sheets

(51) Int. Cl.
*H01M 10/0569* (2010.01)
*H01M 4/587* (2010.01)
*H01M 10/0567* (2010.01)
*H01M 4/50* (2010.01)
*H01M 4/583* (2010.01)
*H01M 50/409* (2021.01)
*H01M 10/058* (2010.01)
*H01M 4/66* (2006.01)
*H01M 10/48* (2006.01)
*H01M 4/02* (2006.01)

(52) U.S. Cl.
CPC .......... *H01M 4/583* (2013.01); *H01M 4/587* (2013.01); *H01M 4/661* (2013.01); *H01M 10/058* (2013.01); *H01M 10/0567* (2013.01); *H01M 10/0569* (2013.01); *H01M 10/48* (2013.01); *H01M 50/409* (2021.01); *H01M 2004/027* (2013.01); *H01M 2004/028* (2013.01); *H01M 2220/20* (2013.01); *Y02E 60/10* (2013.01); *Y02P 70/50* (2015.11); *Y02T 10/70* (2013.01)

(56) References Cited

U.S. PATENT DOCUMENTS

| | | | | |
|---|---|---|---|---|
| 2010/0099018 A1* | 4/2010 | Kawase | ............ | H01M 10/0568 429/105 |
| 2010/0119956 A1* | 5/2010 | Tokuda | ................ | H01M 4/134 429/338 |
| 2010/0136432 A1* | 6/2010 | Kim | ...................... | H01M 4/133 429/231.8 |
| 2012/0074610 A1* | 3/2012 | Wu | ................... | C04B 35/62839 264/105 |
| 2013/0029218 A1* | 1/2013 | Waki | ..................... | H01M 4/587 429/200 |
| 2014/0342246 A1 | 11/2014 | Kim | | |
| 2015/0044567 A1 | 2/2015 | Tanjo et al. | | |
| 2015/0287546 A1* | 10/2015 | Xi | ........................ | H01M 4/133 429/231.8 |
| 2016/0020492 A1 | 1/2016 | Azami et al. | | |

FOREIGN PATENT DOCUMENTS

| | | |
|---|---|---|
| JP | 2002-270159 | 9/2002 |
| JP | 2005-11713 | 1/2005 |
| JP | 2010-92706 | 4/2010 |
| JP | 2010-97756 | 4/2010 |
| JP | 2012-119093 | 6/2012 |
| JP | 2012-146506 | 8/2012 |
| JP | 2013-89327 | 5/2013 |
| JP | 2013-201052 | 10/2013 |
| JP | 2014-225430 | 12/2014 |
| WO | WO 2014/133165 | 9/2014 |

OTHER PUBLICATIONS

Office Action dated Jun. 16, 2020 issued by the Japanese Patent Office in counterpart Japanese Patent Application No. 2016-564833.

* cited by examiner

LITHIUM-ION SECONDARY BATTERY

CROSS-REFERENCE TO RELATED PATENT APPLICATIONS

This application is a National Stage Entry of International Application No. PCT/JP2015/084827, filed Dec. 11, 2015, which claims priority from Japanese Patent Application Nos. 2014-254122, filed Dec. 16, 2014 and 2015-061426, filed Mar. 24, 2015. The entire contents of the above-referenced applications are expressly incorporated herein by reference.

TECHNICAL FIELD

This invention relates to a lithium ion secondary battery, comprising a lithium nickel composite oxide in a positive electrode and having excellent cycle characteristics, and a method of manufacturing the same.

BACKGROUND ART

Non-aqueous electrolyte secondary batteries such as lithium ion secondary batteries are being widely put to practical use as batteries for notebook computers, cellular phones and the like because of their advantages of high energy density, excellent long-term reliability and the like. In recent years, since high-performance of electronic devices and the use of electronic devices for electric cars and the like are advancing, it is desired to further improve buttery properties such as capacity, energy density, lifespan, safety and the like.

It is desirable to use a material having higher discharge capacity in a positive electrode active material in order to increase energy density and capacity of a battery. In recent years, lithium nickel composite oxides wherein a part of nickel acid lithium ($LiNiO_2$) is replaced by another metal element are widely used as the high capacity compound. Among them, the compounds, in which the Ni content is high, have high capacity and are particularly preferable. A battery using lithium nickel composite oxides, in which the Ni content is high, in the positive electrode active material has higher initial discharge capacity than conventional batteries but it has a problem that the discharge capacity reduces while charge and discharge are repeated. For this reason, a positive electrode material of the lithium nickel composite oxide having excellent cycle characteristics is being studied.

Patent Literature 1 discloses that the battery capacity drop by repeating charge/discharge cycles can be suppressed by replacing a part of Ni site of $LiNiO_2$ having layered rock salt structure with Co and optionally one or more atom of Al, Fe, Mn and B to stabilize the crystal structure, and additionally using a water soluble polymer as a binder for carbon materials as a negative electrode active material to suppress swelling the binder itself with electrolyte solution.

CITATION LIST

Patent Literature

Patent Literature 1: Japanese Patent Laid-Open No. 2000-353525

SUMMARY OF INVENTION

Technical Problem

Even in the case of the lithium ion secondary battery disclosed in above Patent Literature 1, sufficient cycle characteristics are not obtained and there remains the problem that capacity of a battery is gradually reduced by repeating charge and discharge. There has still been a demand for a lithium ion secondary battery with long-term cycle characteristics, using lithium nickel composite oxides in which the Ni content is high as a positive electrode active material. In addition, it is desired that a lithium ion secondary battery can be used over a wide range of temperature condition for its use in various fields.

It is an object of the present invention to provide a lithium ion secondary battery having excellent cycle characteristics at a high temperature and comprising the lithium nickel composite oxide, in which the Ni content is high, in a positive electrode.

Solution to Problem

The present invention relates to a lithium ion secondary battery having a positive electrode, a negative electrode, and an electrolyte solution, wherein the positive electrode comprises a lithium nickel composite oxide denoted by the general formula, $LiNi_xCo_yMn_zO_2$, wherein x, y, and z are respectively $0.75 \le x \le 0.85$, $0.05 \le y \le 0.15$, and $0.10 \le z \le 0.20$.

Advantageous Effects of Invention

According to the present invention, it is possible to provide a lithium ion secondary battery having excellent cycle characteristics at a high temperature and comprising lithium nickel composite oxides, in which the Ni content is high, in a positive electrode.

DESCRIPTION OF EMBODIMENTS

Hereinafter, examples of electrodes of the present invention and lithium ion secondary batteries capable of using the electrodes will be described for each component.

[Positive Electrode]

The positive electrode active materials according to the present embodiment include a lithium nickel composite oxide denoted by the formula (A), $$LiNi_xCo_yMn_zO_2 \qquad (A)$$

wherein x, y, and z are respectively $0.75 \le x \le 0.85$, $0.05 \le y \le 0.15$, and $0.10 \le z \le 0.20$, and preferably $0.78 \le x \le 0.82$, $0.05 \le y \le 0.10$, and $0.10 \le z \le 0.15$. Excellent cycle characteristics can be obtained with the lithium nickel composite oxide denoted by the formula (A).

Regarding x, y, and z in the formula (A), x+y+z is preferably 1 but it may be 0.9 or more and 1.2 or less.

For example, the lithium nickel composite oxide denoted by the formula (A) may be obtained by mixing previously prepared nickel/cobalt/manganese compound particle powder having a desired composition ratio with a lithium compound, and then calcining the resulting mixture.

The method of manufacturing the nickel/cobalt/manganese compound is not especially limited, but for example, the nickel/cobalt/manganese compound particle powder (hydroxides, oxyhydroxides, oxides, and the mixture thereof) can be obtained by adding an aqueous solution, where metal salts containing nickel, cobalt, and manganese dissolve such that the molar ratio of Ni:Co:Mn is x:y:z, and an alkaline solution into an alkaline solution simultaneously by means of dropwise, performing a neutralization and a precipitation reaction to obtain reaction slurry containing the nickel/cobalt/manganese compound particles, and then washing and optionally drying the nickel/cobalt/manganese compound particles recovered from the slurry by filtration.

The lithium nickel composite oxide particle powder is obtained by mixing the nickel/cobalt/manganese compound particle powder and a lithium compound such that the molar ratio of Ni:Co:Mn is x:y:z and then calcining the resulting mixture. Active particles of the nickel/cobalt/manganese compound particle powder preferably have an average particle diameter of about 1 to 15 μm. The average particle diameter of the active particles of the nickel/cobalt/manganese compound particle powder is preferably 1 μm or more for the purpose of decreasing the reactivity at the time of addition and suppressing the diffusion to the inside of the particles, and preferably 15 μm or less from the aspect of industrial production.

The above lithium nickel composite oxide may be used alone or in combination of two or more.

The positive electrode according to the present embodiment preferably comprises the lithium nickel composite oxide in an amount of 75 mass % or more in the positive electrode active material, more preferably 85 mass % or more, still more preferably 90 mass % or more, particularly preferably 95 mass % or more, and may comprise it even in an amount of 100 mass %.

In addition to the above described lithium nickel composite oxide, the other active materials may be used as a positive electrode active material. The other active materials are not especially limited and publicly known active materials can be used. For example, the publicly known active materials include lithium manganese having a layered structure or lithium manganese having a spinel structure such as $LiMnO_2$, $Li_xMn_2O_4$ (0<x<2), $Li_2MnO_3$, and $Li_xMn_{1.5}Ni_{0.5}O_4$ (0<x<2); $LiCoO_2$, $LiNiO_2$ or materials in which a part of the transition metal in these materials is replaced by other metal(s); lithium transition metal oxides in which particular transition metals do not exceed half, such as $LiNi_{1/3}Co_{1/3}Mn_{1/3}O_2$; materials in which Li is excessive as compared with the stoichiometric composition in these lithium transition metal oxides; materials having olivine structure such as $LiMPO_4$, and the like. In addition, materials in which a part of elements in these metal oxides is substituted by Al, Fe, P, Ti, Si, Pb, Sn, In, Bi, Ag, Ba, Ca, Hg, Pd, Pt, Te, Zn, La are also usable. These positive electrode active materials may be used alone or in combination of two or more.

Polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide, polyacrylic acid and the like can be used as a positive electrode binder. The amount of the positive electrode binder is preferably 2 to 10 parts by mass based on 100 parts by mass of the positive electrode active material, from the viewpoint of the binding strength and energy density being in a trade-off relation with each other.

To the coated layer comprising the positive electrode active material, an electrically-conductive assistant may be added for the purpose of lowering the impedance. Examples of the electrically-conductive assistant include scary, sooty, or fibrous carbonaceous fine particles such as graphite, carbon black, acetylene black, vapor grown carbon fiber (VGCF (registered trademark) available from Showa Denko), and the like.

As a positive electrode current collector, aluminum, aluminum alloys, nickel, stainless of the iron/nickel/chromium/molybdenum family are preferred. As the shape thereof, foil, flat plate, mesh and the like are exemplified.

The positive electrode may be produced by, on the positive electrode current collector, forming a positive electrode active material layer containing the positive electrode active material and the positive electrode binder.

[Negative Electrode]

The negative electrode active materials according to the present embodiment are not limited and publicly known negative active materials can be used but it is preferable that the negative electrode active material include artificial graphite and hardly graphitizable carbon. More excellent cycle characteristics are achieved by using artificial graphite and hardly graphitizable carbon in the negative electrode active material.

Artificial graphite is a material which is mainly made from raw materials such as coal coke, pitch, and heavy oil and which is graphitized at a relatively high temperature area such as 2200° C. to 3000° C. In the raw materials, artificial graphite is definitely different from natural graphite which is mainly made from natural minerals. From the viewpoint of safety in a lithium ion battery, it is desirable to contain less metal impurity. Since artificial graphite is generally graphitized at the above-mentioned high temperature, artificial graphite contains less impurity and has low resistance in point of electron conductivity. Thus, artificial graphite is suitable for the negative electrode material of the lithium ion battery.

Hardly graphitizable carbon is a material which is not graphitized even when it is heated in an inert atmosphere. In hardly graphitizable carbon, minute graphite crystals are arranged in random directions to form pores with a size of several nm (nanometers) between the crystals.

The negative electrode according to the present embodiment preferably comprises the artificial graphite and the hardly graphitizable carbon in an amount of 75 mass % or more in the negative electrode active material, more preferably 85 mass % or more, still more preferably 90 mass % or more, particularly preferably 95 mass % or more, and may comprise them even in an amount of 100 mass %.

In one embodiment of the present invention, the weight ratio of the artificial graphite to the hardly graphitizable carbon is preferably in the range of 80:20 to 95:5, and more preferably in the range of 85:15 to 95:15 for obtaining excellent cycle characteristics.

The shape of the artificial graphite is not particularly limited but the artificial graphite includes massive artificial graphite, scary artificial graphite, spherical graphite such as MCMB (mesophase microbeads) and the like. Among them, massive artificial graphite is preferable. The shape of the hardly graphitizable carbon is not particularly limited but the shape includes massive, flake like, and scaly shape. Among them, massive shape is preferable.

Whether the shape of the carbon included in the negative electrode active material is spherical or massive can be verified by SEM (scanning electron microscope) observation.

In the SEM image of the negative electrode active material, the case where the ratio (minor axis)/(major axis) between the minor axis direction length (the length in the shortest length direction) and the major axis direction length (the length in the longest length direction) is larger than 0.2 can be determined to be a spherical shape or a massive shape. The (minor axis)/(major axis) of spherical graphite is preferably 0.3 or more and more preferably 0.5 or more.

Spherical graphite is produced from flake-like graphite as a starting material, and has a structure in which flake-like graphite is folded so as to have a spherical shape. Accordingly, schistosities are observed in spherical graphite, and the spherical graphite has a cabbage-like exterior appearance in which schistosities are oriented in various directions. Voids are also observed in the fracture surface of spherical graphite. Because of including spherical graphite as the negative electrode active material, the orientation of the crystals takes various orientations after the rolling step during the preparation of the electrode, and accordingly the lithium ion migration between the electrodes is made to be performed smoothly. Moreover, by using spherical graphite, it is possible to obtain voids suitable for holding the electrolyte solution in the negative electrode active material, and hence it is possible to obtain a lithium secondary battery excellent in high output power property.

In massive graphite, such schistosities as observed in the spherical graphite are not observed, and massive graphite has a homogeneous shape.

Examples of the other negative electrode active materials include carbon materials such as amorphous carbon, diamond-like carbon, a carbon nanotube, oxides such as silicon oxide, aluminum oxide, tin oxide, indium oxide, zinc oxide, lithium oxide, germanium oxide, and phosphorus oxide, metals such as Al, Si, Pb, S, Zn, Cd, Sb, In, Bi, Ag, Ba, Ca, Hg, Pd, Pt, Te, and La. These active materials may be used alone or in combination of two or more, and may be also added to the above-mentioned artificial graphite and hardly graphitizable carbon.

As a negative electrode binder, polyvinylidene fluoride, vinylidene fluoride-hexafluoropropylene copolymer, vinylidene fluoride-tetrafluoroethylene copolymer, polytetrafluoroethylene, polypropylene, polyethylene, polyimide, polyamideimide and the like can be used. In addition to the mentioned materials, styrene butadiene rubber (SBR) is included. When an aqueous binder such as SBR emulsion is used, a thickening agent such as carboxymethyl cellulose (CMC) can also be used. The amount of the negative electrode binder to be used is preferably 0.5 to 20 parts by mass to 100 parts by mass of the negative electrode active material, from the viewpoint of sufficient binding strength and achievement of high energy being in a trade-off relation with each other. The above-mentioned negative electrode binders can be also used as mixtures thereof.

The negative electrode active material may be used with electrically-conductive assistants. Specifically, the electrically-conductive assistants include the same materials specifically exemplified in the positive electrode and the amount thereof may be also the same.

As a negative electrode current collector, aluminum, nickel, copper, silver, and alloys of these are preferable from the viewpoint of the electrochemical stability. Examples of the shape of the negative electrode current collector include foil, flat plate and mesh.

Examples of a method for forming the negative electrode active material layer include a doctor blade method, a die coater method, a CVD method and a sputtering method. The negative electrode current collector may also be formed by forming a thin film of aluminum, nickel or an alloy of these on the negative electrode active material layer by a method such as vapor deposition or sputtering after the negative electrode active material layer is formed beforehand.

[Electrolyte Solution]

The electrolyte solution used in the lithium ion secondary battery according to the present embodiment is not particularly limited but it preferably comprises a nonaqueous solvent and a supporting salt which are stable at the operation potential of the battery.

Examples of the non-aqueous solvent include aprotic organic solvents such as cyclic carbonates such as propylene carbonate (PC), ethylene carbonate (EC) and butylene carbonate (BC); chain carbonates such as dimethyl carbonate (DMC), diethyl carbonate (DEC), ethyl methyl carbonate (EMC) and dipropyl carbonate (DPC); propylene carbonate derivatives; aliphatic carboxylic acid esters such as methyl formate, methyl acetate, and ethyl propionate; ethers such as diethyl ether and ethyl propyl ether; and phosphoric esters such as trimethyl phosphate, triethyl phosphate, tripropyl phosphate, trioctyl phosphate, and triphenyl phosphate; and fluorinated aprotic organic solvents which is formed by substituting at least a part of hydrogen atoms of these compound with fluorine atoms.

Among these, cyclic carbonates and chain carbonates such as ethylene carbonate (EC), propylene carbonate (PC), butylene carbonate (BC), dimethyl carbonate (DMC), diethyl carbonate (DEC), ethyl methyl carbonate (MEC), dipropyl carbonate (DPC) are preferable.

The non-aqueous solvent may be used alone or in combination of two or more.

The supporting salts include lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_3$, and $LiN(CF_3SO_2)_2$. The supporting salt may be used singly or in combination of two or more types. In the view of cost reduction, $LiPF_6$ is preferable.

The electrolyte solution according to the present embodiment may further comprise an additive.

The additive includes, but not limited to halogenated cyclic carbonates, unsaturated cyclic carbonates, cyclic or chain disulfonic acid esters and the like. These additives can improve buttery characteristics such as cycle characteristics. This is inferred to be because these additives are decomposed during charge and discharge of the secondary battery to form a coating film capable of suppressing decomposition of the electrolyte solution and the supporting salt on the surface of the electrode active material.

Examples of the halogenated cyclic carbonate include a compound denoted by the formula (B).

(B)

In the formula (B), A, B, C and D denote each independently a hydrogen atom, a halogen atom, an alkyl group or a halogenated alkyl group having 1 to 6 carbon atoms, and at least one of A, B, C and D is the halogen atom or the halogenated alkyl group. The number of carbon atoms of the alkyl group and the halogenated alkyl group is preferably 1 to 4, and more preferably 1 to 3.

In one embodiment, the halogenated cyclic carbonate is preferably a fluorinated cyclic carbonate. The fluorinated cyclic carbonate includes compounds obtainable by replacing some or all hydrogen atoms of ethylene carbonate (EC), propylene carbonate (PC), butylene carbonate (BC), vinylene carbonate (VC), or the like by fluorine atoms. Among those, 4-fluoro-1,3-dioxolan-2-one (fluoroethylene carbonate: FEC) is preferable.

The content of the fluorinated cyclic carbonate is not particularly limited but it is preferably 0.01 mass % or more and 1 mass % or less in the electrolyte solution. In the case where the content is 0.01 mass % or more, the sufficient the effect of forming the coating film can be obtained. On the other hand, in the case where the content is 1 mass % or less, gas generation due to decomposition of the fluorinated cyclic carbonate itself can be suppressed. In the present embodiment, 0.8 mass % or less is particularly preferable. In the case where the content is 0.8 mass % or less, activity of the negative electrode active material is suppressed and excellent cycle characteristics can be maintained.

The unsaturated cyclic carbonate is a cyclic carbonate having at least one carbon-carbon unsaturated bond in the molecule. Examples of the unsaturated cyclic carbonate include vinylene carbonate compounds such as vinylene carbonate, methyl vinylene carbonate, ethyl vinylene carbonate, 4,5-dimethylvinylene carbonate, 4,5-diethylvinylene carbonate; vinylethylene carbonate compounds such as 4-vinylethylene carbonate, 4-methyl-4-vinylethylene carbonate, 4-ethyl 4-vinylethylene carbonate, 4-n-propyl-4-vinylene ethylene carbonate, 5-methyl-4-vinylethylene carbonate, 4,4-divinylethylene carbonate, 4,5-divinylethylene carbonate, 4,4-dimethyl-5-methylene ethylene carbonate, 4,4-diethyl-5-methylene ethylene carbonate, and the like. Among these, vinylene carbonate and 4-vinylethylene carbonate are preferable, and vinylene carbonate is particularly preferable.

The content of the unsaturated cyclic carbonate is not particularly limited but it is preferably 0.01 mass % or more and 10 mass % or less in the electrolyte solution. In the case where the content is 0.01 mass % or more, the sufficient effect of the coating film formation can be obtained. On the other hand, in the case where the content is 10 mass % or less, gas generation due to decomposition of the unsaturated cyclic carbonate itself can be suppressed. Especially, 5 mass % or less is preferable from the view of suppressing decrease in activity of the negative electrode active material.

Examples of the cyclic or chain disulfonic acid ester include a cyclic disulfonic acid ester denoted by the formula (C) and a chain disulfonic acid ester denoted by the formula (D).

(C)

In the formula (C), $R_1$ and $R_2$ are each independently a substituent selected from the group consisting of a hydrogen atom, an alkyl group having 1 to 5 carbon atoms, a halogen group and an amino group. $R_3$ represents an alkylene group having 1 to 5 carbon atoms, a carbonyl group, a sulfonyl group, a fluoroalkylene group having 1 to 6 carbon atoms, or a divalent group having 2 to 6 carbon atoms in which alkylene units or fluoroalkylene units are bonded through an ether group.

In the formula (C), it is preferable that $R_1$ and $R_2$ are each independently a hydrogen atom, an alkyl group having 1 to 3 carbon atoms, or a halogen group, and it is more preferable that $R_3$ is an alkylene group or fluoroalkylene group, having 1 or 2 carbon atomes.

Examples of a preferable cyclic disulfonic acid ester compound denoted by the formula (C) include the compounds denoted by the formulae (1) to (20).

(1)

(2)

(3)

(4)

(5)

(6)

(7)

(8)

(9)

(10)

(11)

(12)

(13)

(14)

(15)

(16)

(17)

(18)

(19)

$$\underset{(19)}{\text{structure}}$$

<!-- structures 19, 20 and D shown -->

(20)

(D)

$$R^6-\underset{\underset{O}{\|}}{\overset{\overset{O}{\|}}{S}}-\underset{R^4}{\overset{R^7}{C}}-\underset{\underset{O}{\|}}{\overset{\overset{O}{\|}}{S}}-R^5$$

In the formula (D), $R^4$ and $R^7$ each independently represent an atom or a group selected from a hydrogen atom, an alkyl group having 1 to 5 carbon atoms, an alkoxy group having 1 to 5 carbon atoms, a fluoroalkyl group having 1 to 5 carbon atoms, a polyfluoroalkyl group having 1 to 5 carbon atoms, —$SO_2X_3$, wherein $X_3$ is an alkyl group having 1 to 5 carbon atoms, —$SY_1$, wherein $Y_1$ is an alkyl group having 1 to 5 carbon atoms, —COZ, wherein Z is a hydrogen atom or an alkyl group having 1 to 5 carbon atoms, and a halogen atom. $R^5$ and $R^6$ are each independently represent an atom or group selected from an alkyl group having 1 to 5 carbon atoms, an alkoxy group having 1 to 5 carbon atoms, a phenoxy group, a fluoroalkyl group having 1 to 5 carbon atoms, a polyfluoroalkyl group having 1 to 5 carbon atoms, a fluoroalkoxy group having 1 to 5 carbon atoms, a polyfluoroalkoxy group having 1 to 5 carbon atomes, a hydroxyl group, a halogen atom, —$NX_4X_5$, wherein $X_4$ and $X_5$ each independently represent a hydrogen atom or a alkyl group having 1 to 5 carbon atoms, and —$NY_2CONY_3Y_4$, wherein $Y_2$ to $Y_4$ each independently represent a hydrogen atom or a alkyl group having 1 to 5 carbon atoms.

In the formula (D), it is preferable that $R^4$ and $R^7$ are each independently a hydrogen atom, an alkyl group having 1 or 2 carbon atoms, a fluoroalkyl group having 1 or 2 carbon atoms, or a halogen atom, and it is more preferable that $R^5$ and $R^6$ are each independently an alkyl group having 1 to 3 carbon atoms, an alkoxy group having 1 to 3 carbon atoms, a fluoroalkyl group having 1 to 3 carbon atoms, a polyfluoroalkyl group having 1 to 3 carbon atoms, a hydroxyl group, or a halogen atom.

Examples of a preferable chain disulfonic acid ester compound denoted by the formula (D) include the following compounds.

-continued

The content of the cyclic or chain disulfonic acid ester is preferably 0.005 mol/L or more and 10 mol/L or less in the electrolyte solution, more preferably 0.01 mol/L or more and 5 mol/L or less, particularly preferably 0.05 mol/L or more and 0.15 mol/L or less. By setting the content to 0.005 mol/L or more, the sufficient effect of the coating film formation can be obtained. On the other hand, in the case where the content is 10 mol/L or less, the viscosity increase of the electrolyte solution and the resulting resistance increase can be suppressed.

The additive can be used alone or in combination with two or more. In the case using additives in combination with two or more, the total content of the additives is preferably 10 mass % or less in the electrolyte solution, and more preferably 5 mass % or less.

[Separator]

Any separator may be used as long as it suppresses a conductive connection between the positive electrode and the negative electrode, allows the penetration of charge carriers, and has durability in the electrolyte solution. Specific materials suitable for the separator may include polyolefin, for example polypropylene or polyethylene, cellulose, polyethylene terephthalate, polyimide, polyvinylidene fluoride, aramid and the like. They may be used as a form such as porous film, fabric or nonwoven fabric. Especially, the separator formed of aramid is suitable for improving safety against overcharge of the lithium ion secondary battery according to the present invention, where the positive electrode material, in which the Ni content is high, is used as a main material.

[Outer Package]

An outer package of the secondary battery can be selected as appropriate, provided that the material to be selected is stable toward the electrolytic solution and has sufficient moisture barrier properties. For example, in the case of a stacked laminate type secondary battery, laminate films made of aluminum, silica, or alumina-coated polypropylene, polyethylene or the like can be used as the outer package of a laminated secondary battery. In particular, use of an aluminum laminate film is preferable in view of suppressing volume expansion.

[Structure of Secondary Battery]

The secondary battery according to the present embodiment can be a constitution where an electrode element in which a positive electrode and a negative electrode are oppositely disposed and in which an electrolyte solution is enclosed inside the package. Examples of the secondary battery include various types, depending on the structure, shape and the like of the electrodes, such as a cylinder type, a flat wound square type, a laminated square type, a coin type, a flat wound laminate type and a layered laminate type. Among these, the shape of the secondary battery to which the present invention is applied is preferably the layered laminate type from the viewpoint of low price and excellent flexibility in the cell capacity design by means of changing the number of the layered electrode.

Figure 1:
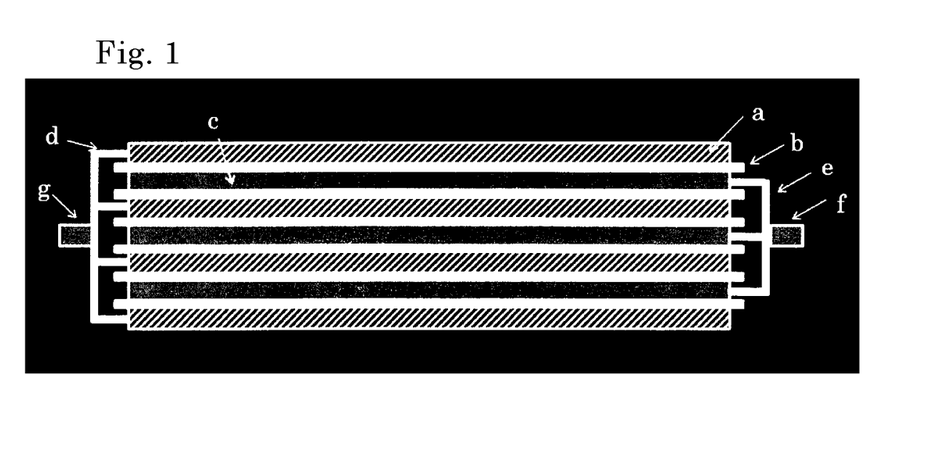
FIG. 1 is a schematic diagram showing laminate type secondary battery according to an embodiment of the present invention.

FIG. 1 is a schematic cross sectional view showing a structure of an electrode element of a layered type secondary battery. This electrode element is formed by alternately stacking a plurality of positive electrodes c and a plurality of negative electrodes a with separators b being interposed therebetween. Positive electrode collectors e each possessed by the positive electrodes c are mutually welded in the end portion which is not covered with a positive electrode active material layer to be thereby electrically connected, and further a positive electrode terminal f is welded to the welded portion. Negative electrode collectors d each possessed by the negative electrodes a are mutually welded in the end portion which is not covered with a negative electrode active material layer to be thereby electrically connected, and further a negative electrode terminal g is welded to the welded portion.

Figure 2:
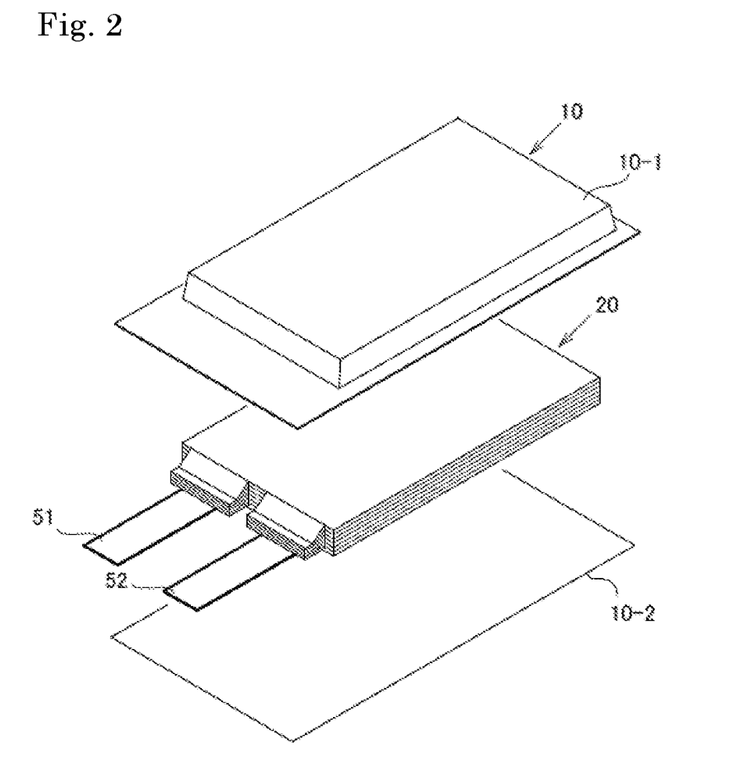
FIG. 2 is an exploded perspective view showing the basic structure of a film-packaged battery.
Figure 3:
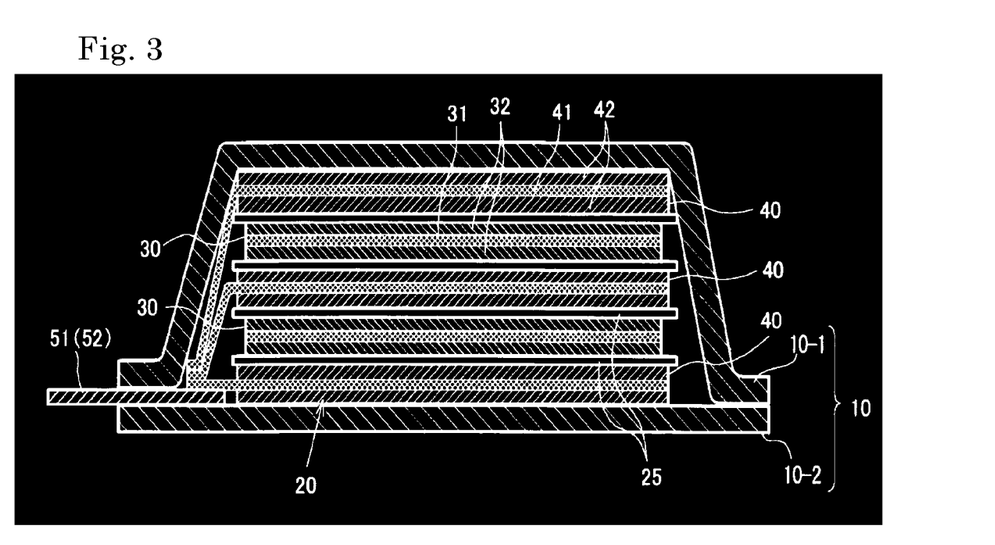
FIG. 3 is a cross-sectional view schematically showing a cross section of the battery in FIG. 2.

As another embodiment, a secondary battery having structure as shown in FIG. 2 and FIG. 3 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 3. In the positive electrode 30, an electrode material 32 is applied to both surfaces of a metal foil 31, and also in the negative electrode 40, an electrode material 42 is applied to both surfaces of a metal foil 41 in the same manner.

In the secondary battery in FIG. 1, the electrode tabs are drawn out on both sides of the package, but a secondary battery to which the present invention may be applied may have an arrangement in which the electrode tabs are drawn out on one side of the package as shown in FIG. 2. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 3). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 2 and FIG. 3, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

[Method for Manufacturing Lithium Ion Secondary Battery]

The lithium ion secondary battery according to the present embodiment can be manufactured in accordance with a usual manner. An example of a method for manufacturing the secondary battery will be described by taking a method for manufacturing the layered laminate type secondary battery as an example. Firstly, the electrode element is formed by, in dry air or an inert gas atmosphere, disposing the negative electrode and the positive electrode with the separator between them. Then, the electrode element is housed in the outer package (container) and the electrolyte solution is injected there to impregnate the electrodes with the electrolyte solution. After that, the opening of the package is sealed to complete the lithium secondary battery.

[Assembled Battery]

A plurality of secondary batteries according to the present embodiment may be combined to form an assembled battery. The assembled battery may be configured by connecting at least two secondary batteries according to the present embodiment in series or in parallel or in combination of both. The connection in series and/or parallel makes it possible to adjust the capacitance and voltage freely. The number of secondary batteries included in the assembled battery can be set appropriately according to the battery capacity and output.

[Vehicle]

The secondary battery or the assembled battery according to the present embodiment can be used in vehicles. Vehicles according to an embodiment of the present invention include hybrid vehicles, fuel cell vehicles, electric vehicles (besides four-wheel vehicles (cars, trucks, commercial vehicles such as buses, light automobiles, etc.) two-wheeled vehicle (bike) and tricycle), and the like. The vehicles according to the present embodiment is not limited to automobiles, it may be a variety of power source of other vehicles, such as a moving body like a train.

[Power Storage Equipment]

The secondary battery or the assembled battery according to the present embodiment can be used in power storage equipment. The power storage devices according to the present embodiment include, for example, those which is connected between the commercial power supply and loads of household appliances and used as a backup power source or an auxiliary power in the event of power outage or the like, or those used as a large scale power storage that stabilize power output with large time variation supplied by renewable energy, for example, solar power generation.

EXAMPLES

Hereafter, an embodiment of the present invention will be explained in details by using examples, but the present invention is not limited to these examples.

Example 1

<Preparation of the Positive Electrode Active Material>

An aqueous solution, where 3 mol/L of nickel sulfate, cobalt sulfate and manganese sulfate are mixed such that Ni:Co:Mn=80:15:5, and 5.0 mol/L of ammonia aqueous solution were simultaneously charged into a reactor. In the reactor, 2 mol/L of aqueous sodium hydroxide solution was automatically charged such that the pH=11.1±0.1 while the inside of the reactor is stirred with a blade stirrer at all times. The resulting nickel/cobalt/manganese hydroxide overflowed into a concentration tank with an overflow pipe, and then the concentrated nickel/cobalt/manganese hydroxide was returned to the reactor to conduct the reaction for 40 hours until the concentration of the nickel/cobalt/manganese hydroxide reaches 4 mol/L. After the reaction, the obtained suspension was washed by a filter press and then dried. As a result, nickel/cobalt/manganese hydroxide particles with Ni:Co:Mn=80:15:5 were provided. The obtained nickel/cobalt/manganese hydroxide particles and lithium carbonate were respectively mixed in a specific amount such that the molar ratio of Li/(Ni+Co+Mn) was 1.03. The mixture was calcined at 930° C. for 8 hours and at 960° C. for 2 hours and then cracked. The average particle diameter of the obtained lithium nickel complex oxide ($LiNi_{0.8}Co_{0.15}Mn_{0.05}O_2$) was 8 µm.

<Production of the Lithium Ion Secondary Battery>

3 mass % of polyvinylidene fluoride (PVdF) as a binder and the balance of the prepared layered lithium nickel complex oxide ($LiNi_{0.8}Co_{0.15}Mn_{0.05}O_2$) having an average particle diameter of 8 µm were homogeneously dispersed in NMP using a revolving/rotating 3-shaft mixer excellent in stirring and mixing to prepare positive electrode slurry. After the positive electrode slurry was homogeneously applied onto an aluminum foil having a thickness of 20 µm as a positive electrode current collector using a coater and dried by evaporating NMP, the rear surface of the positive electrode current collector was also coated in the same manner as above and then dried and the density was then controlled with a roll press to produce a positive electrode active material layer at both sides of the current collector. A mass of the positive electrode active material layer per unit area was 50 mg/cm².

91 mass % of massive artificial graphite surface-coated with amorphous carbon having an average particle size of 10 μm and 5 mass % of hardly graphitizable carbon (mass ratio of the artificial graphite and hardly graphitizable carbon=95:5) as a negative electrode active material, 2 mass % of SBR as a binder, 1 mass % of CMC as a thickening agent, and 1 mass % of carbon black were dispersed in water to prepare negative electrode slurry. The negative electrode slurry was homogenously applied onto a copper foil having a thickness of 10 μm as a negative electrode current collector using a coater and then dried by evaporating water, and the density was then controlled with a roll press to produce a negative electrode active material layer. A mass of the negative electrode active material layer per unit area was 30 mg/cm².

1 mol/L of $LiPF_6$ as an electrolyte was dissolved into a solvent containing ethylene carbonate (EC) and diethyl carbonate (DEC) at a volume ratio of 30:70 to prepare an electrolyte solution.

The obtained positive electrode was cut to 13 cm×7 cm, and the obtained negative electrode was cut to 12 cm×6 cm. Both surfaces of the positive electrode were covered with 14 cm×8 cm separators consisting of aramid porous films, and the negative electrode active material layer was disposed thereon such that the negative electrode active material layer faced the positive electrode active material layer to produce an electrode stack. Then, the electrode stack was inserted into two aluminum laminate films having a size of 15 cm×9 cm, three sides excluding one side of a long side were thermally sealed to width of 8 mm, the electrolyte solution was injected, and the remaining side was thermally sealed to produce a laminate cell as a battery.

<Measurement of Capacity Retention Ratio>

500 charge/discharge cycle tests were performed in a 45° C. constant-temperature bath and the capacity retention ratio was measured to evaluate the lifespan. Regarding the charge, constant current charge was performed at 1 C to an upper limit voltage of 4.2V, subsequently constant voltage charge was performed at 4.2V. The total charging time was 2.5 hours. Regarding the discharge, constant current discharge was performed at 1 C to 2.5V. The capacity after the charge/discharge cycle test was measured and the ratio of the capacity after charge/discharge cycle test to the capacity before charge/discharge cycle test was calculated. Results are shown in Table 1.

<Overcharging Test>

The overcharging test according to JISC8712 was performed on the manufactured battery. A flat presser plate was used to fix the stack part of the battery at a suitable position for the thickness of the battery. The overcharging test was performed at 10 A. The criteria for determine were as follows. In the case where at a battery voltage of abut 6V, the surface temperature of the buttery reached 95° C. and the gas release mechanism portion was opened to stop the battery function, the battery was determined as "very good", in the case where the test was completed without gas emission after reaching 10V, the battery was determined as "good", and in the case where the battery smoked, the battery was determined as "bad".

Examples 2 to 14

Lithium ion secondary batteries were manufactured to measure the cycle characteristic and to conduct the overcharging test as in Example 1 except that the mixing ratio of Ni, Co, and Mn in the lithium nickel complex oxide as a positive electrode active material, mixing ratio of the negative electrode active materials and type and amount of the additive were changed as shown in Table 1. The results are shown in Table 1.

Comparative Examples 1 to 361

Lithium ion secondary batteries were manufactured to measure the cycle characteristic and to conduct the overcharging test as in Example 1 except that the mixing ratio of Ni, Co, Mn and Al in the lithium nickel complex oxide as a positive electrode active material, mixing ratio of the negative electrode active materials and type and amount of the additive were changed as shown in Table 2 or 3. The results are shown in Table 2 and 3.

TABLE 1

| Samples | Mix ratio in the positive electrode active material[1] | | | | Mass ratio in the negative electrode active materials | | Additive in the electrolyte solution | | Cycle characteristic at 45° C. after 500 CY | Separator | Over charge test |
|---|---|---|---|---|---|---|---|---|---|---|---|
| | Ni | Co | Mn | Al | Artificial graphite | Hardly graphitizable carbon | Additive type[2] | Content in the electrolyte solution (mol/l) | (%) | | |
| Example 1 | 80 | 5 | 15 | | 95 | 5 | none | 0 | 90 | aramid porous film | good |
| Example 2 | 80 | 5 | 15 | | 90 | 10 | none | 0 | 92 | aramid porous film | good |
| Example 3 | 80 | 5 | 15 | | 85 | 15 | none | 0 | 92 | aramid porous film | good |
| Example 4 | 80 | 5 | 15 | | 95 | 5 | S | 0.1 | 91 | aramid porous film | good |
| Example 5 | 80 | 5 | 15 | | 90 | 10 | S | 0.05 | 92 | aramid porous film | good |
| Example 6 | 80 | 5 | 15 | | 90 | 10 | S | 0.1 | 93 | aramid porous film | good |
| Example 7 | 80 | 5 | 15 | | 85 | 15 | S | 0.1 | 93 | aramid porous film | good |
| Example 8 | 80 | 10 | 10 | | 95 | 5 | none | 0 | 89 | aramid porous film | good |

TABLE 1-continued

| Samples | Mix ratio in the positive electrode active material[1] | | | | Mass ratio in the negative electrode active materials | | Additive in the electrolyte solution | | Cycle characteristic at 45° C. after 500 CY | Separator | Over charge test |
|---|---|---|---|---|---|---|---|---|---|---|---|
| | Ni | Co | Mn | Al | Artificial graphite | Hardly graphitizable carbon | Additive type[2] | Content in the electrolyte solution (mol/l) | (%) | | |
| Example 9 | 80 | 10 | 10 | | 90 | 10 | none | 0 | 91 | aramid porous film | good |
| Example 10 | 80 | 10 | 10 | | 85 | 15 | none | 0 | 91 | aramid porous film | good |
| Example 11 | 80 | 10 | 10 | | 95 | 5 | S | 0.1 | 90 | aramid porous film | good |
| Example 12 | 80 | 10 | 10 | | 90 | 10 | S | 0.05 | 91 | aramid porous film | good |
| Example 13 | 80 | 10 | 10 | | 90 | 10 | S | 0.1 | 92 | aramid porous film | good |
| Example 14 | 80 | 10 | 10 | | 85 | 15 | S | 0.1 | 92 | aramid porous film | good |

[1] A molar ratio of each metal element to Li in the lithium nickel complex oxide as a positive electrode active material when Li is defined as 100.
[2] The additive, "S" means the cyclic disulfonic acid ester denoted by the formula (1), methylene methanedisulfonate.

TABLE 2

| Samples | Mix ratio in the positive electrode active material[1] | | | | Mass ratio in the negative electrode active materials | | Additive in the electrolyte solution | | Cycle characteristic at 45° C. after 500 CY | Separator | Over charge test |
|---|---|---|---|---|---|---|---|---|---|---|---|
| | Ni | Co | Mn | Al | Artificial graphite | Hardly graphitizable carbon | Additive type[2] | Content in the electrolyte solution (mol/l) | (%) | | |
| Comparative Example 1 | 80 | 15 | 5 | | 95 | 5 | none | 0 | 55 | aramid porous film | good |
| Comparative Example 2 | 80 | 15 | 5 | | 90 | 10 | none | 0 | 58 | aramid porous film | good |
| Comparative Example 3 | 80 | 15 | 5 | | 85 | 15 | none | 0 | 60 | aramid porous film | good |
| Comparative Example 4 | 80 | 15 | 5 | | 95 | 5 | S | 0.1 | 55 | aramid porous film | good |
| Comparative Example 5 | 80 | 15 | 5 | | 90 | 10 | S | 0.1 | 58 | aramid porous film | good |
| Comparative Example 6 | 80 | 15 | 5 | | 85 | 15 | S | 0.1 | 60 | aramid porous film | good |
| Comparative Example 7 | 80 | 15 | | 5 | 95 | 5 | none | 0 | 57 | aramid porous film | good |
| Comparative Example 8 | 80 | 15 | | 5 | 90 | 10 | none | 0 | 58 | aramid porous film | good |
| Comparative Example 9 | 80 | 15 | | 5 | 85 | 15 | none | 0 | 62 | aramid porous film | good |
| Comparative Example 10 | 80 | 15 | | 5 | 95 | 5 | S | 0.1 | 57 | aramid porous film | good |
| Comparative Example 11 | 80 | 15 | | 5 | 90 | 10 | S | 0.1 | 60 | aramid porous film | good |
| Comparative Example 12 | 80 | 15 | | 5 | 85 | 15 | S | 0.1 | 62 | aramid porous film | good |
| Comparative Example 13 | 80 | 10 | 5 | 5 | 95 | 5 | none | 0 | 56 | aramid porous film | good |
| Comparative Example 14 | 80 | 10 | 5 | 5 | 90 | 10 | none | 0 | 59 | aramid porous film | good |
| Comparative Example 15 | 80 | 10 | 5 | 5 | 85 | 15 | none | 0 | 61 | aramid porous film | good |
| Comparative Example 16 | 80 | 10 | 5 | 5 | 95 | 5 | S | 0.1 | 56 | aramid porous film | good |
| Comparative Example 17 | 80 | 10 | 5 | 5 | 90 | 10 | S | 0.1 | 59 | aramid porous film | good |
| Comparative Example 18 | 80 | 10 | 5 | 5 | 85 | 15 | S | 0.1 | 61 | polypropylene | bad |

[1] A molar ratio of each metal element to Li in the lithium nickel complex oxide as a positive electrode active material when Li is defined as 100.
[2] The additive, "S" means the cyclic disulfonic acid ester denoted by the formula (1), methylene methanedisulfonate.

TABLE 3

| Samples | Mix ratio in the positive electrode active material[1] | | | | Mass ratio in the negative electrode active materials | | Additive in the electrolyte solution | | Cycle characteristic at 45° C. after 500 CY | Separator | Over charge test |
|---|---|---|---|---|---|---|---|---|---|---|---|
| | Ni | Co | Mn | Al | Artificial graphite | Hardly graphitizable carbon | Additive type[2] | Content in the electrolyte solution (mol/l) | (%) | | |
| Comparative Example 19 | 80 | 15 | 5 | | 95 | 5 | none | 0 | 50 | aramid porous film | good |
| Comparative Example 20 | 80 | 15 | 5 | | 90 | 10 | none | 0 | 53 | aramid porous film | good |
| Comparative Example 21 | 80 | 15 | 5 | | 85 | 15 | none | 0 | 55 | aramid porous film | good |
| Comparative Example 22 | 80 | 15 | 5 | | 95 | 5 | S | 0.1 | 50 | aramid porous film | good |
| Comparative Example 23 | 80 | 15 | 5 | | 90 | 10 | S | 0.1 | 53 | aramid porous film | good |
| Comparative Example 24 | 80 | 15 | 5 | | 85 | 15 | S | 0.1 | 55 | aramid porous film | good |
| Comparative Example 25 | 80 | 15 | 5 | | 95 | 5 | none | 0 | 52 | aramid porous film | good |
| Comparative Example 26 | 80 | 15 | 5 | | 90 | 10 | none | 0 | 53 | aramid porous film | good |
| Comparative Example 27 | 80 | 15 | 5 | | 85 | 15 | none | 0 | 57 | aramid porous film | good |
| Comparative Example 28 | 80 | 15 | 5 | | 95 | 5 | S | 0.1 | 52 | aramid porous film | good |
| Comparative Example 29 | 80 | 15 | 5 | | 90 | 10 | S | 0.1 | 55 | aramid porous film | good |
| Comparative Example 30 | 80 | 15 | 5 | | 85 | 15 | S | 0.1 | 57 | aramid porous film | good |
| Comparative Example 31 | 80 | 10 | 5 | 5 | 95 | 5 | none | 0 | 51 | aramid porous film | good |
| Comparative Example 32 | 80 | 10 | 5 | 5 | 90 | 10 | none | 0 | 54 | aramid porous film | good |
| Comparative Example 33 | 80 | 10 | 5 | 5 | 85 | 15 | none | 0 | 56 | aramid porous film | good |
| Comparative Example 34 | 80 | 10 | 5 | 5 | 95 | 5 | S | 0.1 | 51 | aramid porous film | good |
| Comparative Example 35 | 80 | 10 | 5 | 5 | 90 | 10 | S | 0.1 | 54 | aramid porous film | good |
| Comparative Example 36 | 80 | 10 | 5 | 5 | 85 | 15 | S | 0.1 | 56 | polypropylene | bad |

[1] A molar ratio of each metal element to Li in the lithium nickel complex oxide as a positive electrode active material when Li is defined as 100.
[2] The additive, "S" means the cyclic disulfonic acid ester denoted by the formula (1), methylene methanedisulfonate.

In all of the examples, it was confirmed that the capacity close to before the test could be maintained even after the 500 charge/discharge cycle tests at a high temperature of 45° C.

INDUSTRIAL APPLICABILITY

The secondary battery of the present invention may be used in any industrial field where power supply is needed, and in industrial fields related to transport, storage, and supply of electric energy. More specifically, the secondary battery may be used for power sources for mobile devices such as cellular phone and notebook computer; power sources for transfer/transport vehicles such as electrically-powered vehicles including electric vehicle, hybrid vehicle, electric motorcycle and power-assisted bicycle, electric train, satellite, and submarine; backup power sources such as UPS; power storage system to store electric power generated by solar power generation, wind power generation, or the like; and the like.

EXPLANATION OF SYMBOLS a Negative electrode
b Separator
c Positive electrode
d Positive electrode current collector
e Negative electrode current collector
f Positive electrode tab
g Negative electrode tab
10 Film outer package
20 Battery element
25 Separator
30 Positive electrode
40 Negative electrode

The invention claimed is:
1. A lithium ion secondary battery having a positive electrode, a negative electrode, and an electrolyte solution, wherein the positive electrode comprises a lithium nickel complex oxide denoted by the formula (A),

$$LiNi_xCo_yMn_zO_2 \quad (A)$$

wherein x, y, and z are respectively $0.75 \leq x \leq 0.85$, $0.05 \leq y \leq 0.10$, and $0.10 \leq z \leq 0.15$, and z is equal to or larger than y, and the negative electrode comprises artificial graphite particles with coatings consisting of an amorphous carbon, and hardly graphitizable carbon particles;

wherein a mass ratio of the artificial graphite particles to the hardly graphitizable carbon particles is in a range of 85:15 to 90:10, and wherein the electrolyte solution comprises a disulfonic acid ester in an amount of 0.1 mol/L or more and an electrolyte solvent comprising ethylene carbonate in an amount of 30 vol % or more.

2. The lithium ion secondary battery according to claim 1, wherein the lithium nickel complex oxide denoted by the formula (A) is comprised in an amount of 75 mass % or more in a positive electrode active material.

3. The lithium ion secondary battery according to claim 1, wherein the artificial graphite and the hardly graphitizable carbon are comprised in an amount of 75 mass % or more in a negative electrode active material.

4. The lithium ion secondary battery according to claim 1, wherein the hardly graphitizable carbon is comprised in an amount of 5 mass % or more in a negative electrode active material.

5. The lithium ion secondary battery according to claim 1, wherein the negative electrode further comprises carbon black.

6. A vehicle comprising the lithium ion secondary battery according to claim 1.

7. A method for manufacturing the lithium ion secondary battery of claim 1, comprising the steps of:

fabricating an electrode element by disposing the positive electrode and the negative electrode so as to be faced with each other, and encapsulating the electrode element, and the electrolyte solution into an outer package.

\* \* \* \* \*